(12) United States Patent
Kallio et al.

(10) Patent No.: US 11,290,046 B2
(45) Date of Patent: Mar. 29, 2022

(54) ELECTRICAL DRIVE SYSTEM WITH INDEPENDENT DIAGNOSTICS

(71) Applicant: ABB Schweiz AG, Baden (CH)

(72) Inventors: Janne Kallio, Helsinki (FI); Petri Havanto, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/101,011

(22) Filed: Nov. 23, 2020

(65) Prior Publication Data

US 2021/0159831 A1 May 27, 2021

(30) Foreign Application Priority Data

Nov. 26, 2019 (EP) ..................................... 19211386

(51) Int. Cl.
| | |
|---|---|
| *H02P 21/12* | (2016.01) |
| *H02P 21/18* | (2016.01) |
| *G05B 9/02* | (2006.01) |
| *G05B 23/02* | (2006.01) |
| *H02P 27/06* | (2006.01) |

(52) U.S. Cl.
CPC ................ *H02P 21/18* (2016.02); *G05B 9/02* (2013.01); *G05B 23/0205* (2013.01); *H02P 27/06* (2013.01)

(58) Field of Classification Search
CPC ........ H02P 21/18; H02P 27/06; H02P 29/024; G05B 9/02; G05B 23/0205
See application file for complete search history.

(56) References Cited

U.S. PATENT DOCUMENTS

| | | | |
|---|---|---|---|
| 2002/0161492 A1 | 10/2002 | Eckardt et al. | |
| 2003/0193310 A1* | 10/2003 | Raftari | H02P 23/14 318/798 |
| 2010/0134064 A1 | 6/2010 | Heikkila | |
| 2015/0084574 A1 | 3/2015 | Defaix et al. | |
| 2020/0130732 A1* | 4/2020 | Pramod | B62D 5/049 |
| 2020/0348652 A1* | 11/2020 | Kohvakka | G05B 19/4185 |

OTHER PUBLICATIONS

European Patent Office, Extended Search Report issued in corresponding Application No. 19211386.8, dated Apr. 24, 2020, 8 pp.

* cited by examiner

*Primary Examiner* — Muhammad S Islam
(74) *Attorney, Agent, or Firm* — Leydig, Voit & Mayer, Ltd.

(57) ABSTRACT

An electrical drive system including an inverter and an electrical machine supplied by the inverter. A method for controlling the electrical drive system includes: receiving a machine current signal and a machine voltage signal of a machine current supplied to the electrical machine; determining a switching signal based on the machine current signal and controlling the inverter with the switching signal; estimating a first speed estimate from the machine current signal; estimating a second speed estimate from the machine voltage signal; and comparing the first speed estimate and the second speed estimate with each other, and, when the first speed estimate and the second speed estimate deviate from each other more than a threshold, activating a fault reaction of the electrical drive system, which sets the electrical drive system to a predefined state.

19 Claims, 2 Drawing Sheets

ELECTRICAL DRIVE SYSTEM WITH INDEPENDENT DIAGNOSTICS

FIELD OF THE INVENTION

The invention relates to a method, a computer program, a computer-readable medium and a controller for controlling an electrical drive system. Additionally, the invention relates to an electrical drive system.

BACKGROUND OF THE INVENTION

Electrical drives are used to supply electrical motors, which are part of a system, which need to be safe for users with respect to a desired safety level. An electrical drive and in particular its control system may provide functional safety features to help system builders to achieve this desired safety level. Functional safety systems usually require comprehensive diagnostics to make sure that the measures implemented are based on true actions of the system. One way to implement diagnostics is redundancy. All critical measurement and/or operation may be implemented with two different hardware solutions and the results may be compared. There also may be two different measurement techniques to limit the probability of a common cause of failure.

For example, electrical drives offer different types of functional safety functions, such as safe torque off (STO), safe stop 1 (SS1), safe stop emergency (SSE), safely-limited speed (SLS), safe maximum speed (SMS) and safe brake control (SBC). Functions like SS1, SLS and SMS usually require feedback with respect to a motor speed.

US 2015/084574 A1 describes a control system for controlling an electric motor. The control system comprises a first estimator for estimating a first speed of the motor from measured phase voltages of the motor M and a second estimator for estimating a second speed of the motor from measured phase currents of the motor. The measured phase currents are further used to generate switching signals for an inverter connected to the motor. A safety block compares the two estimated speeds with each other and may cause the motor to stop in dependence of a divergence between them.

US 2010/134064 A1 describes a method for estimating a speed of an electric motor. A speed estimation arrangement calculates a speed estimate of the motor from measured voltages and/or measured currents of the motor and sends it to a safety supervision system. A control unit of an inverter connected to the motor calculates an alternative speed estimate and also sends it to the safety supervision system, which then compares the two speed estimates. If the two speed estimates differ from each other more than a predetermined threshold value, an emergency braking of the motor may be activated.

US 2002/161492 A1 describes a method for monitoring the speed of an electric machine using two separate processors connected via a communication link.

DESCRIPTION OF THE INVENTION

It is an objective of the invention to provide an electric drive system with safer fault reactions.

This objective is achieved by the subject-matter of the independent claims. Further exemplary embodiments are evident from the dependent claims and the following description.

A first aspect of the invention relates to a method for controlling an electrical drive system. The electrical drive system, which may be a medium or low voltage system, comprises an inverter and an electrical machine supplied by the inverter. The inverter may comprise two or more half-bridges and/or may convert a DC voltage from a DC link into an AC voltage to be supplied to the electrical machine. The method may be automatically performed by a controller of the drive system.

According to an embodiment of the invention, the method comprises: receiving a machine current signal and a machine voltage signal of a machine current supplied to the electrical machine. The voltage and current of the AC voltage supplied to the electrical machine may be measured with sensors and may be converted into signals that may be processed by the control system. It has to be noted that signals mentioned herein also may be digitized signals, i.e. values that vary over time. However, the signals also may be analogue signals. Also a DC link voltage signal may be received, which may be provided by a voltage sensor in a DC link to which the inverter is connected.

According to an embodiment of the invention, the method further comprises: determining a switching signal based on the machine current signal and optional the DC link voltage signal and controlling the inverter with the switching signal. For example, the control system may receive a torque reference or a speed reference from a superordinated converter and may determine a current reference therefrom. For example with pulse width modulation, a switching signal for power semiconductor switches of the inverter may be generated. The switching signal may comprise switching instants for a plurality of power semiconductor switches of the inverter.

According to an embodiment of the invention, the method further comprises: estimating a first speed estimate from the machine current signal; estimating a second speed estimate from the machine voltage signal; and comparing the first speed estimate and the second speed estimate with each other, and, when the first speed estimate and the second speed estimate deviate from each other more than a threshold, activating a fault reaction of the electrical drive system, which sets the electrical drive system to a predefined state.

For example, the first speed estimate may be determined as a fundamental frequency of the machine current signal. The second speed estimate may be determined as a fundamental frequency of the machine voltage signal. When the both speed estimates differ from each other substantially, which may be detected by comparing their difference with a threshold, then it may be assumed that the control applied to the electrical machine is not as desired, i.e. that something went wrong and the value is not valid.

In this case, one or more fault reactions of the electrical drive systems may be activated. A fault reaction may be a program or software module, which performs actions that transform the electrical drive system to a defined state. For example, the fault reaction may execute a safety function, such as safe torque off (STO), safe stop 1 (SS1), safe stop emergency (SSE), safely-limited speed (SLS), safe maximum speed (SMS) and/or safe brake control (SBC). With a fault reaction, at least one of a torque and a speed of the electrical machine may be reduced, for example to an uncritical value. It also may be that the electrical machine is completely stopped.

According to an embodiment of the invention, the machine current signal is a multi-phase signal and the first speed estimate comprises a component for each phase and/or the machine voltage signal is a multi-phase signal and the second speed estimate comprises a component for each phase. As already mentioned, the drive system may be a multi-phase system, such as a three-phase system. In this case, each phase current and/or phase voltage may be measured and converted into a corresponding signal.

However, it may be that the first speed estimate is determined as a one component quantity and/or that the second speed estimate is determined as a one component quantity.

According to an embodiment of the invention, the first multi-phase speed estimate and the second multi-phase speed estimate are compared component-wise. In this case, the fault reaction may be activated, when at least one of the components deviates more than the threshold from each other.

According to an embodiment of the invention, the switching signal is determined by an inverter controller, to which the machine current signal is supplied. The control system may comprise several components, such as an inverter controller and a safety controller. The inverter controller may be responsible for controlling the semiconductor switches of the inverter, while the safety controller may be responsible for monitoring the operation of the inverter controller and for activating fault reactions.

It may be that the machine voltage signal is solely supplied to a safety controller, which activates the fault reaction. The control of the inverter performed by the inverter controller may be done independently of the machine voltage signal. This may increase the independence of the safety controller and its functions from the inverter controller.

According to an embodiment of the invention, the machine voltage signal and/or the machine current signal is measured at poles of the electrical machine. The measurements may be performed between the inverter and the electrical drive. Since the machine current signal is used for controlling the inverter and the machine voltage signal may be used for determining the second speed estimate, the machine voltage measurement may be used for diagnosing the machine current measurements. In particular, independent pole voltage measurements may be used for this. This may remove the need to add additional measurement hardware and may reduce the system cost.

According to an embodiment of the invention, the fault reaction comprises: controlling the inverter to reduce at least one of the torque and the speed of the electrical machine. It may be that a fault signal is sent from the safety controller to the inverter controller, which starts to control the inverter in a safety mode. In this mode, the inverter controller may try to stop the electrical machine in a controlled way.

According to an embodiment of the invention, the fault reaction comprises: sending a braking signal to a brake of the electrical machine. Another option is that the safety controller generates a braking signal for the electrical machine, which is then stopped by activating a mechanical brake.

A further aspect of the invention relates to a computer program for controlling an electrical drive system, which, when executed by at least one processor, is adapted for performing the method as described above and below. The method may be performed as a computer program in the control system. The control system may comprise several processors, which may have different safety levels. For example, the inverter controller may comprise a processor with a lower safety level as the safety controller.

A further aspect of the invention relates to a computer-readable medium, in which such a computer program is stored. The computer-readable medium may be a memory of the control system. In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to control system for an electrical drive system adapted for performing the method as described above and below.

The control system may comprise an inverter controller for determining the switching signal based on the machine current signal and optional the DC link voltage signal and for controlling the inverter with the switching signal. The control system may comprise a safety controller for comparing the first speed estimate and the second speed estimate with each other, and for optionally executing the fault reaction.

According to an embodiment of the invention, the safety controller and the inverter controller are implemented in different hardware components. Both controllers may be implemented in different hardware, for example each of the controllers may be provided by a program module run in a dedicated processor. It may be that the control system comprises a multi-core processor and that the both controllers are run in different cores of the multi-core processor. These cores may have different safety levels.

There are several options, by which component of the control system the first speed estimate is determined.

According to an embodiment of the invention, the safety controller estimates the first speed estimate and the second speed estimate. Both speed estimates may be determined by the same component, which may have a higher safety level as the component used for determining the switching signals, i.e. the inverter controller.

According to an embodiment of the invention, the inverter controller estimates the first speed estimate and the safety controller estimates the second speed estimate. As the inverter controller usually needs a speed estimate for performing its control functions, this speed estimate may be used as the first speed estimate. Furthermore, in this case, the speed estimates are provided by different components, which may decrease the susceptibility to errors.

A further aspect of the invention relates to an electrical drive system, which comprises an inverter for converting a DC link voltage into an output voltage to be supplied to an electrical machine and a controller system as described above and below. Additionally, the drive system may comprise a rectifier and/or a DC link with one or more capacitors.

It has to be understood that features of the method as described in the above and in the following may be features of the electrical drive system as described in the above and in the following, and vice versa. The same applies to the computer program, the computer-readable medium and the control system.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
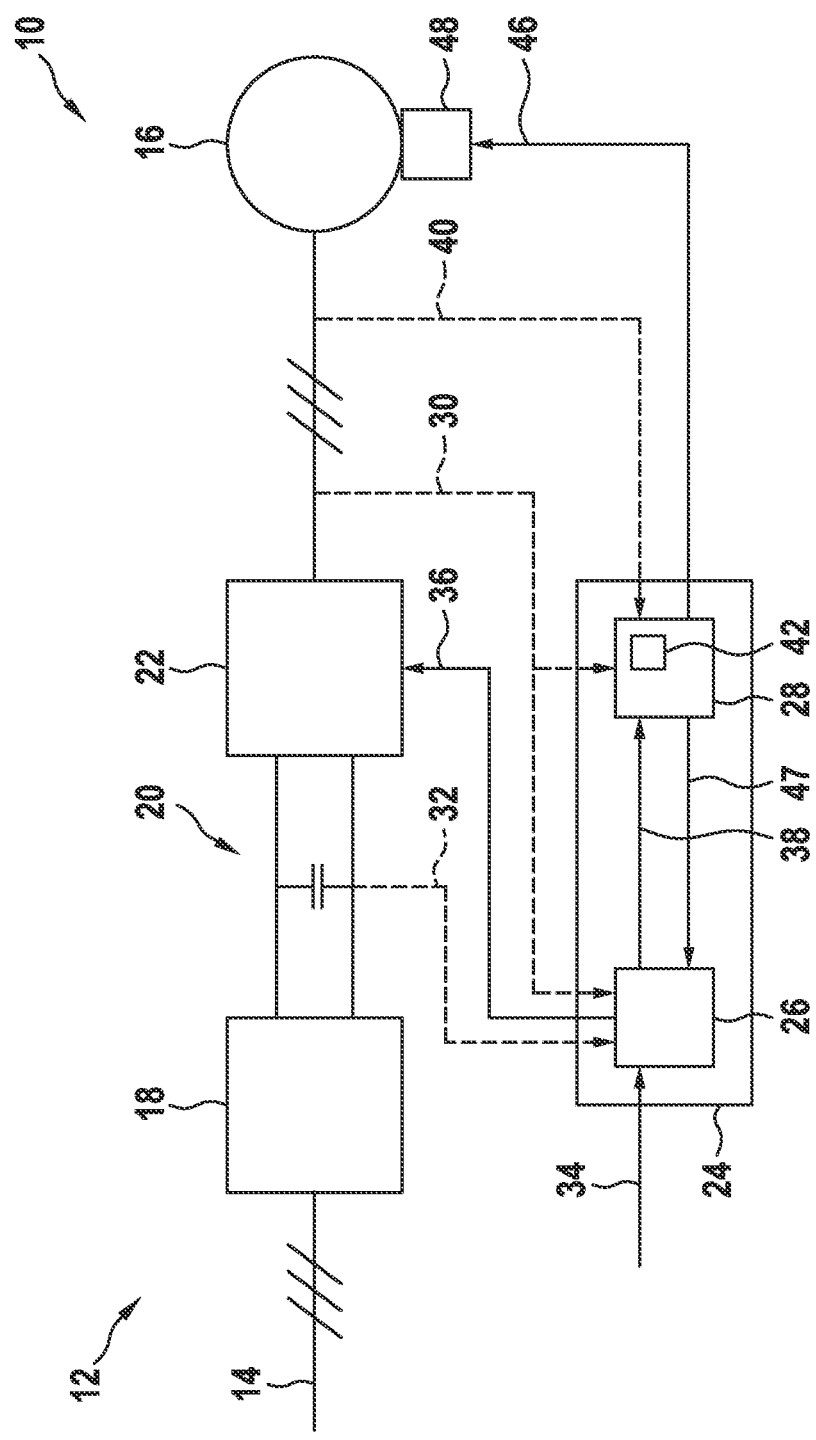
FIG. 1 schematically shows an electrical drive system according to an embodiment of the invention.

FIG. 1 shows a drive system 10, which comprises an electrical converter 12, which is interconnected between an electrical grid 14 and a rotating electrical machine 16, such as an electrical motor and/or generator.

The converter 12 comprises a rectifier 18 for rectifying an AC input voltage provided by the electrical grid. The input voltage may be a three-phase voltage and/or the rectifier 18 may be a passive three-phase rectifier. The rectified input voltage is then supplied to a DC link 20, which comprises one or more DC link capacitors.

An inverter 22 is connected to the DC link 20 and converts the DC link voltage to an AC output voltage, which is supplied to the electrical machine 16. The output voltage may be a three-phase voltage. The inverter 22 may comprise one or more half-bridges with controllable semiconductor switches.

The converter 12 and in particular the inverter 22 are controlled by a control system 24, which comprises an inverter controller 26 and a safety controller 28. The inverter controller 26 receives a machine current signal 30 and optionally DC link voltage signal 32. From a speed or torque reference 34, which may be supplied by a superordinated controller, and the signals 30, 32, the inverter controller 26 determines a switching signal 36 for the inverter 22.

The inverter controller 26 also estimates a first speed estimate 38, which indicates an actual speed of the electrical machine 16. In transient operations, the first speed estimate 38 may be different from the speed reference 34. The speed estimate 38 may be determined from the machine current signal 30, for example by determining a fundamental frequency of the machine current signal 30. The speed estimate 38 is then supplied to the safety controller 28.

It also may be that the first speed estimate 38 is determined by the safety controller 28, which also may receive the machine current signal 30.

The safety controller 28 furthermore receives a machine voltage signal 40 and estimates a second speed estimate 42 from the machine voltage signal 40. This again may be done by determining a fundamental frequency of the machine voltage signal. 40.

As described in more detail below, the safety controller 28 is adapted for generating an error signal 44, which is sent to the inverter controller 26, when an unsafe state of the drive system 10 is detected. Also, in this case, the safety controller may generate a braking signal 46, which is sent to a mechanical brake 48 for braking the electrical machine 16.

The machine current signal 30, the DC link voltage signal 32 and the machine voltage signal 40 may be provided by sensors measuring the respective currents and/or voltages. In particular, the machine voltage signal 40 and/or the machine current signal 3 may be measured at poles of the electrical machine 16. It has to be noted that the machine current signal 30 and the machine voltage signal 40 may be multi-phase quantities, such as three-phase quantities in the case of a three-phase system.

Figure 2:
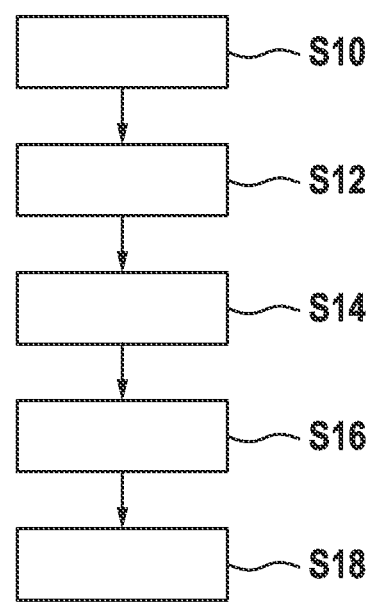
FIG. 2 shows a flow diagram for a method for controlling the electrical drive system of FIG. 1.

FIG. 2 shows a flow diagram for a method for controlling the electrical drive system 10, which may be performed by the control system 24 as shown in FIG. 1.

In step S10, the machine current signal 30 is measured at the supply line for supplying the electrical machine 16. Also, the DC link voltage signal 32 is measured at the DC link 20. The machine current signal 30, the DC link signal 32 and the reference 34 are received in the inverter controller 26 and the inverter controller 26 determines the switching signal 36 based on these quantities. The switching signal 36 is sent to the inverter 22 and the inverter 22 and in particular its semiconductor switches are controlled with the switching signal 36.

In step S12, a first speed estimate 38 is determined from the machine current signal 30. This may be done by the inverter controller 26, where the first speed estimate 38 may already be calculated during the determination of the switching signal. It also may be that the safety controller 28 estimates the first speed estimate 38. In this case, the machine current signal 30 also may be supplied to the safety controller 28.

In step S14, the machine voltage signal 40 is measured at the supply line for supplying the electrical machine 16. The machine voltage signal 40 is received in the safety controller 28 and the safety controller 28 estimates the second speed estimate 42 from the machine voltage signal 40. It may be that the machine voltage signal 40 is solely supplied to the safety controller 28.

With the second speed estimate 42, an independent electrical frequency may be computed from a pole voltage status of motor phases. Both speed estimates 38, 42 may be determined from independent measurements. Furthermore, the measurement of the machine voltage signal 40 may be independent from the generation of the switching signal 36, i.e. the inverter controller 26 may not use the machine voltage signal 40 as a feedback for control. Only phase current information, i.e. the machine current signal 30, may be used.

It also has to be noted that the current measurements and/or the generation of the machine current signal 30 may be implemented with a single multi-channel AD converter, which may be a common cause of failure.

As already mentioned, the machine current signal 30 may be a three-phase signal and the first speed estimate 38 may comprise a component for each phase. It also may be that the machine voltage signal 40 is a three-phase signal and that the second speed estimate 42 comprises a component for each phase.

In step S16, the safety controller 28 compares the first speed estimate 38 and the second speed estimate 42 with each other. In the case of multi-component quantities, the first speed estimate 38 and the second speed estimate 42 may be compared component-wise.

If the speed estimates 38, 42 are substantially the same (at least during steady-state operation), problems in the current measurement path may be ruled out and/or it may be assumed that the system 10 is operating properly.

When the first speed estimate 38 and the second speed estimate 42 (or at least one of their components) deviate from each other more than a threshold, the safety controller 28 then may execute and/or may activate a fault reaction of the electrical drive system 10.

The current and voltage based speed estimations 38, 42 may solely provide accurate results in specific operating points. For example, both values may be inaccurate with certain conditions like quick torque and/or speed changes.

In step S18, one or more fault reactions are executed. This also may be done by the safety controller 28. The one or more fault reactions may be computer programs and/or software modules also executed by a processor of the safety controller 28 and/or of the inverter controller 26.

Each of the fault reaction may be intended for setting the drive system 10 into a predefined state. For example, at least one of a torque and a speed of the electrical machine 16 may be reduced to safely shut down the drive system 10 and/or to guide the drive system 10 into a defined state.

It may be that a fault reaction is activated, which controls the inverter 22 to reduce at least one of the torque and the speed of the electrical machine 16. Such a fault reaction may be executed by the inverter controller 26, when it receives an error signal 44 generated by the safety controller 28.

It also may be that a fault reaction is activated, which generates a braking signal 46, which is sent to a brake 48 of the electrical machine 16. Such a fault reaction may be executed by the safety controller 28.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 drive system
12 electrical converter
14 electrical grid
16 rotating electrical machine
18 rectifier
20 DC link
22 inverter
24 control system
26 inverter controller
28 safety controller
30 machine current signal
32 DC link voltage signal
34 speed and/or torque reference
36 switching signal
38 first speed estimate
40 machine voltage signal
42 second speed estimate
44 error signal
46 braking signal
48 mechanical brake

The invention claimed is:

1. A method for controlling an electrical drive system, the electrical drive system comprising an inverter and an electrical machine supplied by the inverter, the method comprising:
receiving a machine current signal and a machine voltage signal of a machine current supplied to the electrical machine;
determining a switching signal based on the machine current signal and controlling the inverter with the switching signal;
estimating a first speed estimate from the machine current signal;
estimating a second speed estimate from the machine voltage signal;
comparing the first speed estimate and the second speed estimate with each other, and, when the first speed estimate and the second speed estimate deviate from each other more than a threshold, activating a fault reaction of the electrical drive system, which sets the electrical drive system to a predefined state;
wherein the machine current signal is a multi-phase signal and the first speed estimate comprises a component for each phase;
wherein the machine voltage signal is a multi-phase signal and the second speed estimate comprises a component for each phase;
wherein the first speed estimate and the second speed estimate are compared component-wise.

2. The method of claim 1,
wherein the switching signal is determined by an inverter controller, to which the machine current signal is supplied.

3. A control system for an electrical drive system comprising an inverter and an electrical machine supplied by the inverter, adapted for performing the method of claim 1, the control system comprising:
an inverter controller for determining the switching signal based on the machine current signal and for controlling the inverter with the switching signal;
a safety controller for comparing the first speed estimate and the second speed estimate with each other.

4. The method of claim 1, wherein the machine voltage signal is solely supplied to a safety controller, which activates the fault reaction.

5. The method of claim 1, wherein the machine voltage signal and/or the machine current signal are measured at poles of the electrical machine.

6. The method of claim 1, wherein the fault reaction comprises: controlling the inverter to reduce at least one of the torque and the speed of the electrical machine.

7. The method of claim 1, wherein the fault reaction comprises: sending a braking signal to a brake of the electrical machine.

8. The method of claim 2,
wherein the machine voltage signal is solely supplied to a safety controller, which activates the fault reaction.

9. The control system of claim 3,
wherein the safety controller and the inverter controller are implemented in different hardware components.

10. The control system of claim 3,
wherein the safety controller estimates the first speed estimate and the second speed estimate.

11. An electrical drive system, comprising:
an inverter for converting a DC link voltage into an output voltage to be supplied to an electrical machine;
a controller system according to claim 3.

12. The control system of claim 3, wherein the inverter controller estimates the first speed estimate and the safety controller estimates the second speed estimate.

13. The method of claim 8,
wherein the machine voltage signal and/or the machine current signal are measured at poles of the electrical machine.

14. The control system of claim 9,
wherein the inverter controller estimates the first speed estimate and the safety controller estimates the second speed estimate.

15. The control system of claim 9, wherein the safety controller estimates the first speed estimate and the second speed estimate.

16. The method of claim 13,
wherein the fault reaction comprises: controlling the inverter to reduce at least one of the torque and the speed of the electrical machine.

17. The method of claim 16,
wherein the fault reaction comprises: sending a braking signal to a brake of the electrical machine.

18. A computer program for controlling an electrical drive system, the electrical drive system comprising an inverter and an electrical machine supplied by the inverter, which, when executed by at least one processor, is adapted to
receive a machine current signal and a machine voltage signal of a machine current supplied to the electrical machine;
determine a switching signal based on the machine current signal and controlling the inverter with the switching signal;
estimate a first speed estimate from the machine current signal;
estimate a second speed estimate from the machine voltage signal;
compare the first speed estimate and the second speed estimate with each other, and, when the first speed estimate and the second speed estimate deviate from each other more than a threshold, activate a fault reaction of the electrical drive system, which sets the electrical drive system to a predefined state;
wherein the machine current signal is a multi-phase signal and the first speed estimate comprises a component for each phase;
wherein the machine voltage signal is a multi-phase signal and the second speed estimate comprises a component for each phase;
wherein the first speed estimate and the second speed estimate are compared component-wise.

19. A non-transitory computer-readable medium, in which a computer program according to claim 18 is stored.

* * * * *